US012739172B1

(12) United States Patent
Sagarwala et al.

(10) Patent No.: US 12,739,172 B1
(45) Date of Patent: Sep. 15, 2026

(54) APPARATUS, SYSTEM, AND METHOD FOR SELECTIVELY CONFIGURING LINE CARDS TO CONSERVE POWER IN NETWORK FABRICS

(71) Applicant: Juniper Networks, Inc., Sunnyvale, CA (US)

(72) Inventors: Muhammad Sagarwala, Los Gatos, CA (US); John Kenney, Groton, MA (US); Saikat Sanyal, Bangalore (IN); Gurmeet Singh, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 287 days.

(21) Appl. No.: 18/417,223

(22) Filed: Jan. 19, 2024

(51) Int. Cl.
*H04L 41/0833* (2022.01)
*H04L 12/28* (2006.01)
*H04L 45/28* (2022.01)
*H04L 47/125* (2022.01)

(52) U.S. Cl.
CPC ...... *H04L 41/0833* (2013.01); *H04L 12/2892* (2013.01); *H04L 45/28* (2013.01); *H04L 47/125* (2013.01)

(58) Field of Classification Search
None
See application file for complete search history.

(56) References Cited

U.S. PATENT DOCUMENTS

2003/0147385 A1* 8/2003 Montalvo .......... H04L 47/2441 370/428
2020/0287844 A1* 9/2020 Venkatakrishnan ........................ H04L 43/0876
2023/0281144 A1* 9/2023 Wilkinson .......... G06F 13/4027 710/316

* cited by examiner

*Primary Examiner* — Christine T Duong
(74) *Attorney, Agent, or Firm* — ALG Intellectual Property, LLC

(57) ABSTRACT

A system for selectively configuring line cards to conserve power and/or costs of goods in network fabrics may include a first line card and a second line card. In this example, the second line card may include (1) a set of connectors capable of communicatively coupling a set of links to the first line card, (2) a multiplexer that facilitates defining a configuration through which the set of links are communicatively coupled to the first line card via the set of connectors, and (3) circuitry that (A) detects a density type of the first line card and (B) programs the multiplexer to define the configuration based at least in part on the density type of the first line card. Various other apparatuses, systems, and methods are also disclosed.

20 Claims, 8 Drawing Sheets

Circuitry 116

SerDes Device 118

Multiplexer 218

Demultiplexer 220

Connector 120(1)

Connector 120(2)

Connector 120(3)

Connector 120(4)

Connector 120(5)

Connector 120(6)

Connector 120(7)

Connector 120(8)

Connector 120(9)

Links 204

Links 206

Links 208

APPARATUS, SYSTEM, AND METHOD FOR SELECTIVELY CONFIGURING LINE CARDS TO CONSERVE POWER IN NETWORK FABRICS

BACKGROUND

In certain network fabrics, line cards may be communicatively coupled to one another via various fabric cards. Some line cards may be designed to connect to one another via all the fabric cards regardless of the needs of and/or density types of the line cards. Unfortunately, such designs may cause low-density line cards to consume and/or expend much more power than necessary to achieve line rate in connection with network fabrics. Additionally or alternatively, such designs may lead to excessive and/or superfluous costs of goods in connection with network fabrics. The instant disclosure, therefore, identifies and addresses a need for apparatuses, systems, and methods for selectively configuring line cards to conserve power and/or costs of goods in network fabrics.

SUMMARY

As will be described in greater detail below, the instant disclosure generally relates to apparatuses, systems, and methods for selectively configuring line cards to conserve power in network fabrics. In one example, a system for selectively configuring line cards to conserve power and/or costs of goods in network fabrics may include a first line card and a second line card. In this example, the second line card may include (1) a set of connectors capable of communicatively coupling a set of links to the first line card, (2) a multiplexer that facilitates defining a configuration through which the set of links are communicatively coupled to the first line card via the set of connectors, and (3) circuitry that (A) detects a density type of the first line card and (B) programs the multiplexer to define the configuration based at least in part on the density type of the first line card.

Similarly, a corresponding apparatus may include (1) a set of connectors capable of communicatively coupling a set of links to a line card, (2) a multiplexer that facilitates defining a configuration through which the set of links are communicatively coupled to the line card via the set of connectors, and (3) circuitry that (A) detects a density type of the line card and (B) programs the multiplexer to define the configuration based at least in part on the density type of the line card.

A corresponding method may include (1) communicatively coupling a set of links to a line card via a set of connectors, (2) arranging a multiplexer to facilitate define a configuration through which the set of links are to communicate with the line card, and (3) configuring circuitry to (A) detect a density type of the line card and (B) program the multiplexer to define the configuration based at least in part on the density type of the line card.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
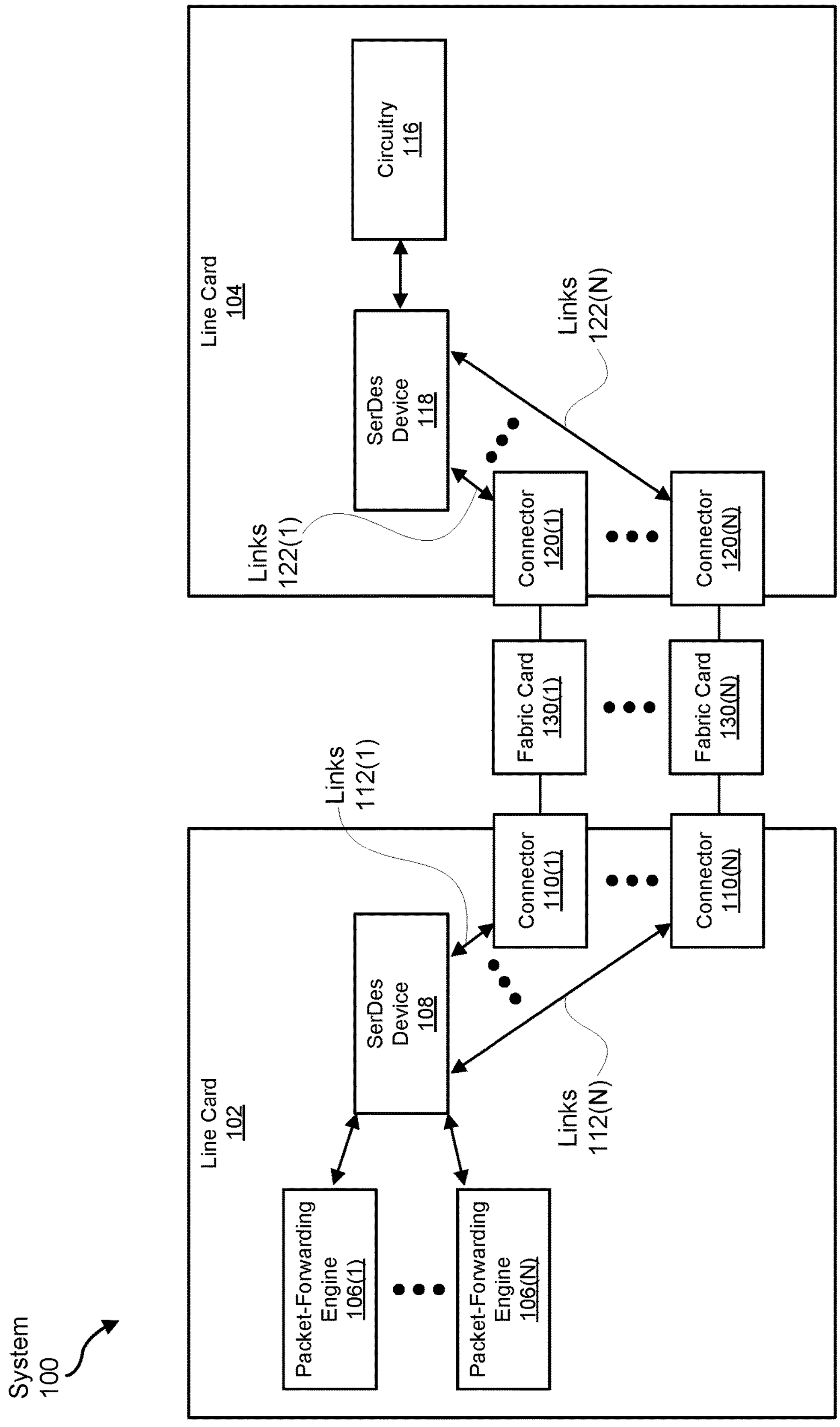
FIG. 1 is an illustration of an exemplary system for selectively configuring line cards to conserve power in network fabrics according to one or more embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for selectively configuring line cards to conserve power and/or reduce costs of goods in network fabrics. As will be explained in greater detail below, embodiments of the present disclosure may involve a low-density line card may be communicatively coupled to another line card via a set of fabric cards. In some examples, the low-density line card may include and/or represent a multiplexer and/or a demultiplexer that facilitate defining configurations through which a set of links on the low-density line card are communicatively coupled to the other line card. In one example, the low-density line card may also include and/or represent circuitry that detects a density type of the other line card and then programs the multiplexer and/or the demultiplexer to define a configuration that optimizes the power efficiency and/or cost of goods in connection with the set of fabric cards.

As a specific example, if the other line card is a high-density type, then the low density-line card may program the multiplexer and/or demultiplexer to define a configuration through which the set of links are communicatively coupled to all of the connectors on the backplane of the low-density line card. As another example, if the other line card is a medium-density type, then the low density-line card may program the multiplexer and/or demultiplexer to define a configuration through which the set of links are communicatively coupled to a medium subset of the connectors (e.g., between one-third and two-thirds of the available connectors) on the backplane of the low-density line card. As a further example, if the other line card is also a low-density type, then the low density-line card may program the multiplexer and/or demultiplexer to define a configuration through which the set of links are communicatively coupled to a low subset of the connectors (e.g., one-third or less of the available connectors) on the backplane of the low-density line card.

Accordingly, some line cards described herein may be designed to selectively configure communications paths that account for the needs of and/or density types of one another. By selectively configuring such communication paths, the line cards may be able to consume and/or expend much less power than conventional designs while still maintaining and/or achieving line rate for network fabrics. Additionally or alternatively, such line cards may enable users, administrators, and/or customers to avoid excessive and/or superfluous costs of goods in connection with network fabrics.

The following will provide, with reference to FIGS. 1-7, detailed descriptions of an exemplary apparatuses, systems, and corresponding implementations and configurations that facilitate and/or support selectively configuring line cards to conserve power in network fabrics. In addition, the following will provide, with reference to FIG. 8, examples of methods for selectively configuring line cards to conserve power in network fabrics.

FIG. 1 illustrates an exemplary system 100 for selectively configuring line cards to conserve power in network fabrics. As illustrated in FIG. 1, system 100 may include and/or represent line cards 102 and 104 that are communicatively coupled to one another via fabric cards 130(1)-(N). In some examples, line card 102 may include and/or represent packet-forwarding engines 106(1)-(N), a serializer/deserializer (SerDes) device 108, and/or connectors 110(1)-(N). In one example, a set of links 112(1)-(N) may span and/or run through or across different components and/or features of line card 102. For example, links 112(1)-(N) may communicatively couple SerDes device 108 to connectors 110(1)-(N). Additionally or alternatively, links 112(1)-(N) may communicatively couple SerDes device 108 to packet-forwarding engines 106(1)-(N).

In some examples, line card 104 may include and/or represent circuitry 116, a SerDes device 118, and/or connectors 120(1)-(N). In one example, a set of links 122(1)-(N) may span and/or run through or across different components and/or features of line card 104. For example, links 122(1)-(N) may communicatively couple SerDes device 118 to connectors 120(1)-(N). Additionally or alternatively, links 122(1)-(N) may communicatively couple SerDes device 118 to circuitry 116.

In some examples, connectors 110(1)-(N) and/or 120(1)-(N) may facilitate and/or support communicatively coupling links 112(1)-(N) and/or 122(1)-(N) to one another via fabric cards 130(1)-(N). In other words, connectors 110(1)-(N) and/or 120(1)-(N) may be capable of communicatively coupling links 112(1)-(N) and/or 122(1)-(N) to one another via fabric cards 130(1)-(N).

In some examples, SerDes devices 108 and 118 may each include and/or represent a multiplexer and/or a demultiplexer. For example, the multiplexer and/or demultiplexer included in SerDes device 118 may facilitate and/or support defining a configuration through which links 122(1)-(N) are communicatively coupled to line card 102 via connectors 120(1)-(N). Additionally or alternatively, the multiplexer and/or demultiplexer included in SerDes device 108 may facilitate and/or support defining a configuration through which links 112(1)-(N) are communicatively coupled to line card 104 via connectors 110(1)-(N). In certain implementations, links 112(1)-(N) and/or 122(1)-(N) may be communicatively coupled to one another via fabric cards 130(1)-(N).

In some examples, circuitry 116 may detect, determine, and/or identify a density type of line card 102. For example, circuitry 116 may obtain data and/or information indicative of the number of packet-forwarding engines 106(1)-(N), connectors 110(1)-(N), and/or other components in line card 102. In this example, the density type of line card 102 may correspond to, be defined by, and/or be informed by the number of packet-forwarding engines 106(1)-(N), connectors 110(1)-(N), and/or other components in line card 102.

In one example, a high-density line card may be equipped with a number of components (such as packet-forwarding engines and/or ports) that satisfies and/or exceeds an upper threshold. In another example, a medium-density line card may be equipped with a number of components that satisfies one or more thresholds (e.g., above a lower threshold but below an upper threshold). In an additional example, a low-density line card may be equipped with a number of components that satisfies and/or remains below a lower threshold.

As a specific example, a high-density line card may include and/or represent three or more packet-forwarding engines and/or application-specific integrated circuits (ASICs). Additionally or alternatively, a high-density line card may include and/or represent nine or more connectors and/or ports. In another example, a medium-density line card may include and/or represent two packet-forwarding engines and/or ASICs. Additionally or alternatively, a medium-density line card may include and/or represent six connectors and/or ports. In an additional example, a low-density line card may include and/or represent one packet-forwarding engine and/or ASIC. Additionally or alternatively, a low-density line card may include and/or represent three or less connectors and/or ports.

In some examples, circuitry 116 may program multiplexer and/or demultiplexer to define a configuration through which links 122(1)-(N) are communicatively coupled to line card 102 via connectors 120(1)-(N) based at least in part on the density type of line card 102. For example, if line card 102 is a high-density type, then circuitry 116 may program SerDes device 118 to define a configuration through which all of connectors 120(1)-(N) are communicatively coupled to line card 102. In another example, if line card 102 is a medium-density type, then circuitry 116 may program SerDes device 118 to define a configuration through which a medium subset of connectors 120(1)-(N) are communicatively coupled to line card 102. In this example, the medium subset of connectors 120(1)-(N) may include and/or represent a grouping consisting of between one-third and two-thirds of connectors 120(1)-(N) (e.g., six out of nine total connectors). In an additional example, if line card 102 is a low-density type, then circuitry 116 may program SerDes device 118 to define a configuration through which a low subset of connectors 120(1)-(N) are communicatively coupled to line card 102. In this example, the low subset of connectors 120(1)-(N) may include and/or represent a grouping consisting of one-third or less of connectors 120 (1)-(N) (e.g., three out of nine total connectors).

In some examples, circuitry 116 may program multiplexer and/or demultiplexer to define a configuration through which links 122(1)-(N) are activated to exchange traffic with line card 102 via connectors 120(1)-(N) based at least in part on the density type of line card 102. For example, if line card 102 is a high-density type, then circuitry 116 may program SerDes device 118 to define a configuration in which all of connectors 120(1)-(N) are activated exchange traffic with line card 102. In another example, if line card 102 is a medium-density type, then circuitry 116 may program SerDes device 118 to define a configuration in which a medium-subset of connectors 120(1)-(N) are activated exchange traffic with line card 102. In an additional example, if line card 102 is a low-density type, then circuitry 116 may program SerDes device 118 to define a configuration in which a low-subset of connectors 120(1)-(N) are activated exchange traffic with line card 102. In certain implementations, all the connectors outside the subset that is activated may remain inactive and/or unused.

As a specific example, if line card 104 includes one hundred and sixty-two links and line card 102 is a high-density type, then circuitry 116 may program SerDes device 118 to define a configuration in which eighteen links are routed to each of nine different connectors. In another example, if line card 104 includes one hundred and sixty-two links and line card 102 is a medium-density type, then circuitry 116 may program SerDes device 118 to define a configuration in which twenty-seven links are routed to each of six different connectors. In an additional example, if line card 104 includes one hundred and sixty-two links and line card 102 is a low-density type, then circuitry 116 may program SerDes device 118 to define a configuration in which fifty-four links are routed to each of three different connectors.

In some examples, line cards 102 and 104 may each include and/or represent field-replaceable units (FRUs) capable of being installed and/or inserted in slots of a router chassis. In one example, line cards 102 and 104 may represent part of and/or be associated with a switch fabric and/or network fabric included in system 100. Additionally or alternatively, line cards 102 and 104 may be hot-insertable and/or hot-removable such that insertion and/or removal is accomplished without powering off and/or disrupting the corresponding router functions of system 100. In certain implementations, line cards 102 and 104 may each include and/or represent a single assembly that combines one or more packet-forwarding engines and one or more connectors or ports.

In some examples, packet-forwarding engines 106(1)-(N) may each include and/or represent a hardware-implemented device capable of parsing, reading, and/or interpreting packet headers as well as transferring packets from one interface and/or port to another for the purpose of forwarding traffic. In one example, packet-forwarding engines 106 (1)-(N) may each include and/or represent an ASIC dedicated to transferring packets from an ingress connector and/or port to an egress connector and/or port. By doing so, each ASIC may forward incoming traffic to the next stage in its journey to a destination in the forwarding plane (as opposed to the control plane). Additional examples of packet-forwarding engines 106(1)-(N) include, without limitation, field-programmable gate arrays (FPGAs), application-specific integrated circuits (ASICs), systems on chips (SoCs), control logic, parallel accelerated processors, tensor cores, integrated circuits, chiplets, portions of one or more of the same, variations or combinations of one or more of the same, and/or any other suitable packet-forwarding engines.

In some examples, circuitry 116 may include and/or represent one or more electrical and/or electronic circuits capable of processing, applying, modifying, transforming, displaying, transmitting, receiving, and/or executing data for line card 104. Additionally or alternatively, circuitry 116 may launch, perform, and/or execute certain executable files, code snippets, and/or computer-readable instructions to facilitate and/or support detecting and/or sensing fluid leaks in fluid-cooled devices. Although illustrated as a single unit in FIG. 1, circuitry 116 may include and/or represent a collection of multiple processing units and/or electrical or electronic components that work and/or operate in conjunction with one another. Examples of circuitry 116 include, without limitation, ASICs, central processing units (CPUs), processing devices, microprocessors, microcontrollers, graphics processing units (GPUs), FPGAs, SoCs, parallel accelerated processors, tensor cores, integrated circuits, chiplets, optical modules, receivers, transmitters, transceivers, optical modules, portions of one or more of the same, variations or combinations of one or more of the same, and/or any other suitable circuitry.

In some examples, connectors 110(1)-(N) and 120(1)-(N) may each include and/or represent one or more interfaces and/or ports. For example, connectors 110(1)-(N) and 120 (1)-(N) each include and/or represent one or more Ethernet ports that interface one or more links with a fabric card. In one example, fabric cards 130(1)-(N) may collectively form all or part of a switch fabric and/or switch control board between line cards 102 and 104. Additionally or alternatively, fabric cards 130(1)-(N) may each include and/or represent an ASIC dedicated to transferring and/or exchanging packets between line cards 102 and 104.

In some examples, links 112(1)-(N) and 122(1)-(N) may each include and/or represent a wired connection and/or lane or channel of traffic. In one example, links 112(1)-(N) and 122(1)-(N) may form all or part of a local area network (LAN) and/or a wide area network (WAN). As a specific example, links 112(1)-(N) and 122(1)-(N) may each include and/or represent an Ethernet connection in a LAN and/or WAN.

Figure 2:
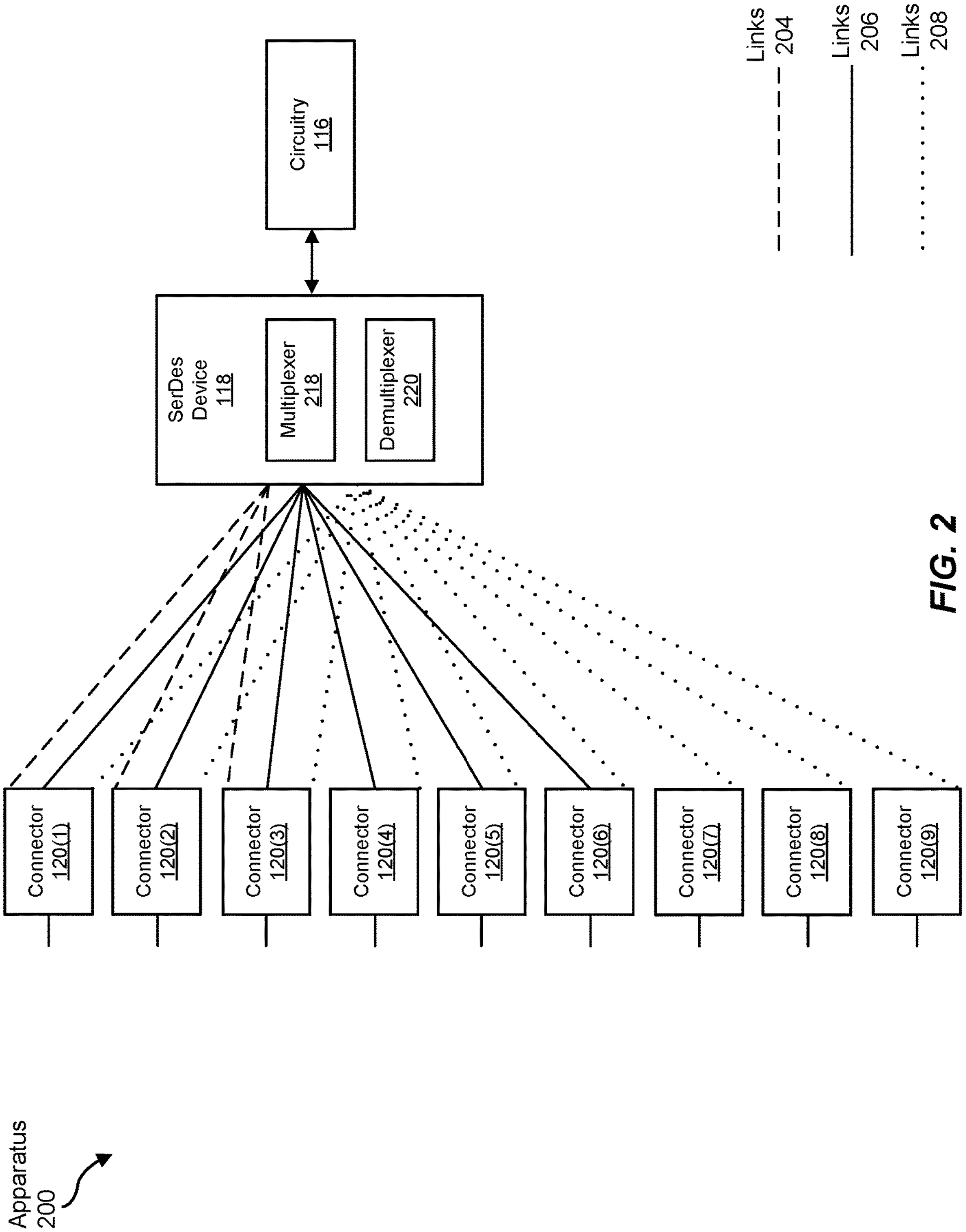
FIG. 2 is an illustration of an exemplary apparatus for selectively configuring line cards to conserve power in network fabrics according to one or more embodiments of this disclosure.

FIG. 2 illustrates an exemplary apparatus 200 for selectively configuring line cards to conserve power in network fabrics. In some examples, apparatus 200 may include and/or represent certain devices, components, and/or features that perform and/or provide functionalities that are similar and/or identical to those described above in connection with FIG. 1. In one example, apparatus 200 may include and/or represent all or part of a line card. Additionally or alternatively, circuitry 116 may configure and/or program SerDes device 118 to define certain routes and/or paths of communication for links between SerDes device 118 and one or more of connectors 120(1), 120(2), 120(3), 120(4), 120(5), 120(6), 120(7), 120(8), and 120(9).

As a specific example, if apparatus 200 is connected to a high-density line card, circuitry 116 may configure and/or program SerDes device 118 to route one hundred and sixty-two links between SerDes device 118 and connectors 120(1)-(9). For example, this configuration and/or programming may cause SerDes device 118 to route links 208 between SerDes device 118 and connectors 120(1)-(9). In this configuration and/or programming, eighteen different links may run between SerDes device 118 and each of connectors 120(1)-(9).

As another example, if apparatus 200 is connected to a medium-density line card, circuitry 116 may configure and/or program SerDes device 118 to route one hundred and sixty-two links between SerDes device 118 and connectors 120(1)-(6). For example, this configuration and/or programming may cause SerDes device 118 to route links 206 between SerDes device 118 and connectors 120(1)-(6). In this configuration and/or programming, twenty-seven different links may run between SerDes device 118 and each of connectors 120(1)-(6).

As an additional example, if apparatus 200 is connected to a low-density line card, circuitry 116 may configure and/or program SerDes device 118 to route one hundred and sixty-two links between SerDes device 118 and connectors 120(1)-(3). For example, this configuration and/or programming may cause SerDes device 118 to route links 204 between SerDes device 118 and connectors 120(1)-(3). In this configuration and/or programming, fifty-four different links may run between SerDes device 118 and each of connectors 120(1)-(3).

In some examples, Serdes device 118 may include and/or represent a multiplexer 218 and/or a demultiplexer 220 that facilitate, support, and/or control routing and/or redirecting the various links to and/or across connectors 120(1)-(9). In one example, multiplexer 218 and/or demultiplexer 220 may define, route, redirect, and/or control the incoming and/or outgoing links or communication paths of apparatus 200 in connection with packet-forwarding engines and/or fabric cards.

Figure 3:
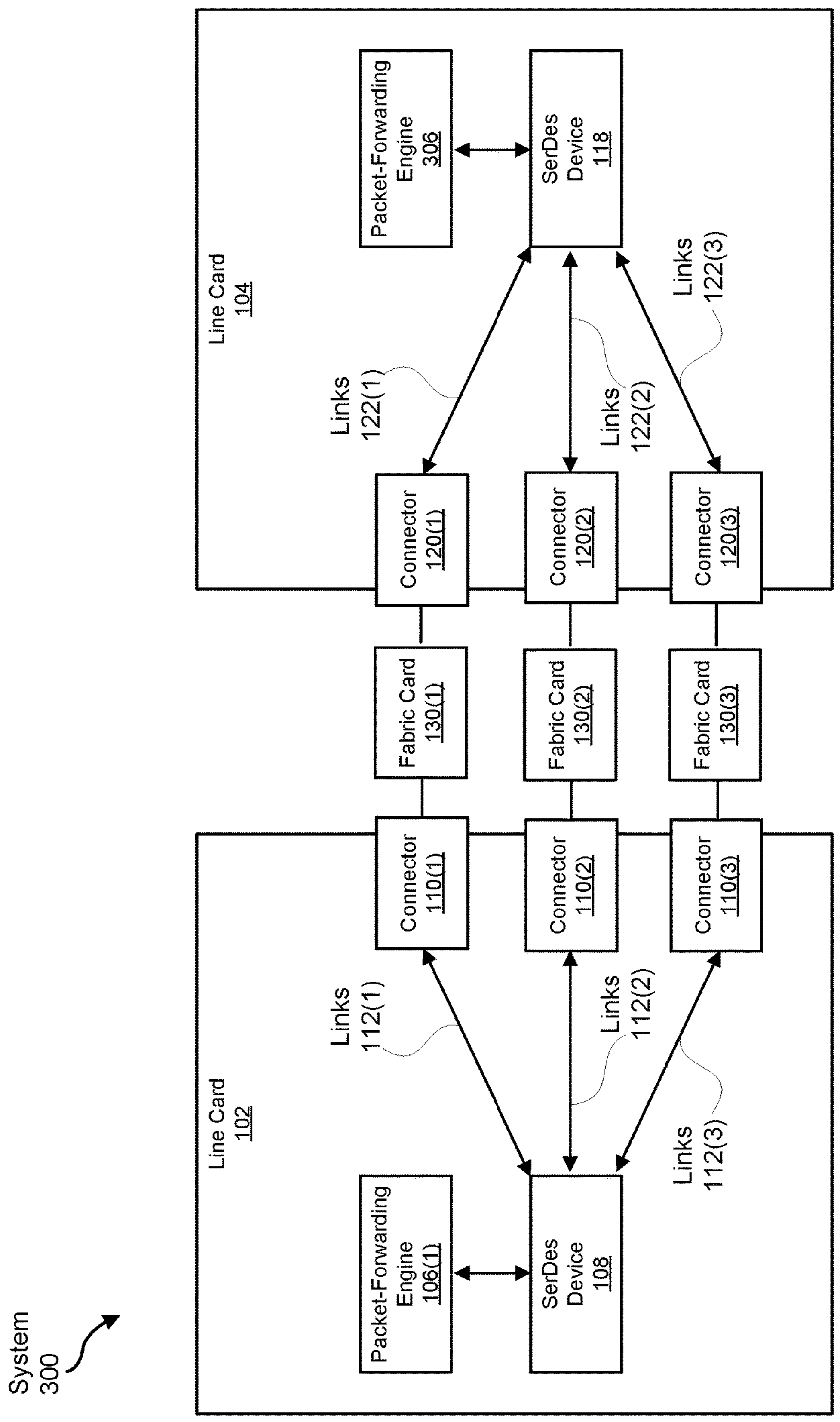
FIG. 3 is an illustration of an exemplary system for selectively configuring line cards to conserve power in network fabrics according to one or more embodiments of this disclosure.

FIG. 3 illustrates an exemplary system 300 for selectively configuring line cards to conserve power in network fabrics. In some examples, system 300 may include and/or represent certain devices, components, and/or features that perform and/or provide functionalities that are similar and/or identical to those described above in connection with FIG. 1 and/or FIG. 2. In one example, system 300 may include and/or represent a configuration in which line card 102 is connected to a low-density line card. For example, line card 102 may be a low-density type that includes and/or represents packet-forwarding engine 106(1) and connectors 110(1)-(3). Additionally or alternatively, line card 104 may be low-density type that includes and/or represents a packet-forwarding engine 306 and at least connectors 120(1)-(3). In certain implementations, line card 104 may include and/or represent connectors 120(1)-(9) even though only connectors 120(1)-(3) are illustrated and/or labelled in FIG. 3.

In some examples, circuitry 116 may determine that line card 102 is a low-density type. For example, circuitry 116 may obtain data and/or information from line card 102. In this example, the data and/or information may indicate that line card 102 includes and/or is equipped with packet-forwarding engine 106(1) and connectors 110(1)-(3). Circuitry 116 may then determine that line card 102 is a low-density type based at least in part on the data and/or information.

In some examples, circuitry 116 may program SerDes device 118 to define a configuration in which links 122(1)-(3) are routed and/or activated between SerDes device 118 and one or more of connectors 120(1)-(3) in response to determining that line card 102 is a low-density type. In such examples, this configuration may cause and/or enable links 122(1)-(3) to be communicatively coupled to links 112(1)-(3) via fabric cards 130(1)-(3). Accordingly, traffic may be exchanged between line cards 102 and 104 via links 112(1)-(3) and 122(1)-(3) and/or fabric cards 130(1)-(3).

Figure 4:
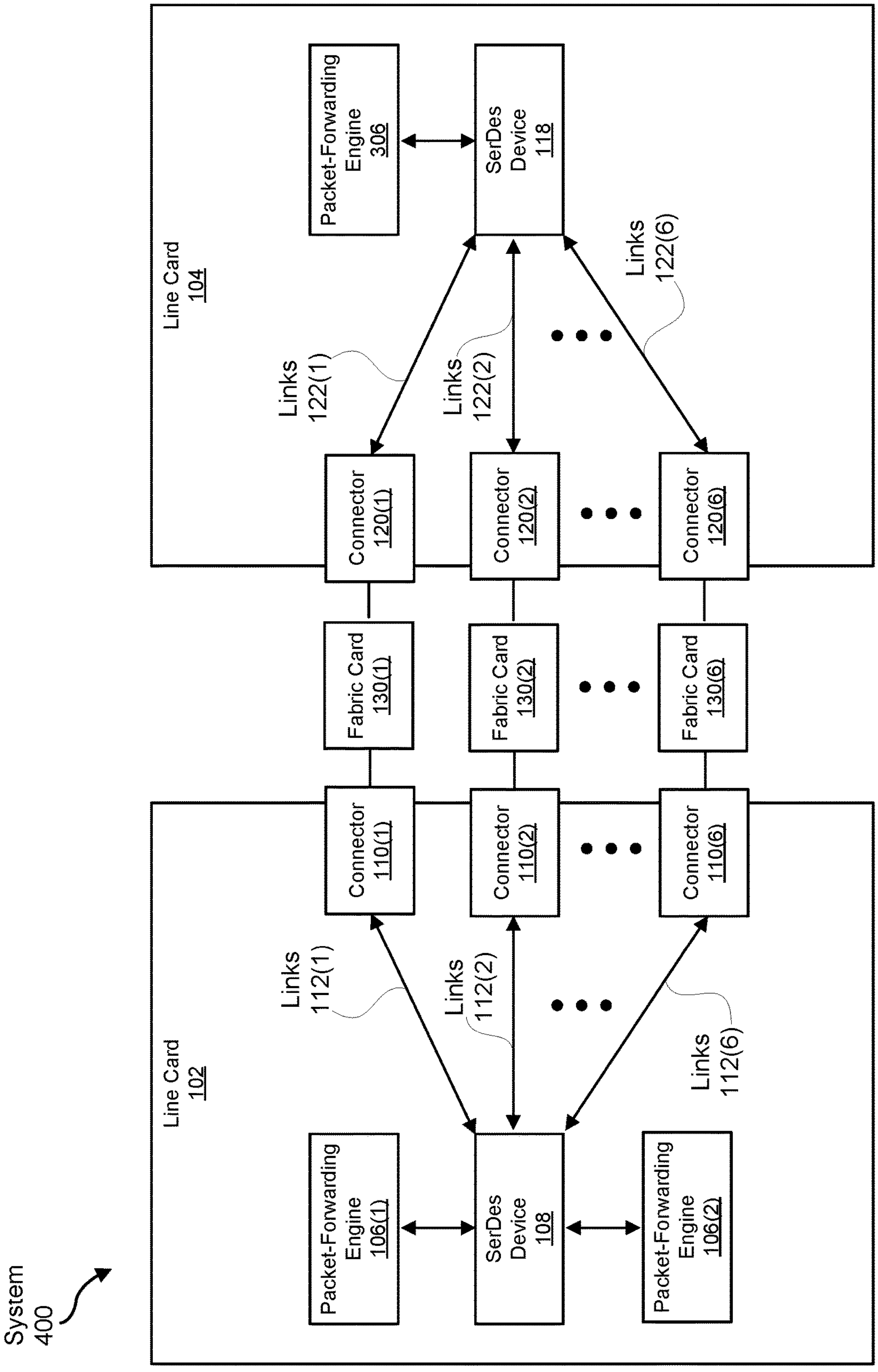
FIG. 4 is an illustration of an exemplary system for selectively configuring line cards to conserve power in network fabrics according to one or more embodiments of this disclosure.

FIG. 4 illustrates an exemplary system 400 for selectively configuring line cards to conserve power in network fabrics. In some examples, system 400 may include and/or represent certain devices, components, and/or features that perform and/or provide functionalities that are similar and/or identical to those described above in connection with any of FIGS. 1-3. In one example, system 400 may include and/or represent a configuration in which line card 102 is connected to a medium-density line card. For example, line card 102 may be a medium-density type that includes and/or represents packet-forwarding engines 106(1)-(2) and connectors 110(1)-(6). Additionally or alternatively, line card 104 may be a low-density type that includes and/or represents packet-forwarding engine 306 and at least connectors 120(1)-(6). In certain implementations, line card 104 may include and/or represent connectors 120(1)-(9) even though only connectors 120(1)-(6) are illustrated and/or labelled in FIG. 4.

In some examples, circuitry 116 may determine that line card 102 is a medium-density type. For example, circuitry 116 may obtain data and/or information from line card 102. In this example, the data and/or information may indicate that line card 102 includes and/or is equipped with packet-forwarding engines 106(1)-(2) and connectors 110(1)-(6). Circuitry 116 may then determine that line card 102 is a medium-density type based at least in part on the data and/or information.

In some examples, circuitry 116 may program SerDes device 118 to define a configuration in which links 122(1)-(6) are routed and/or activated between SerDes device 118 and one or more of connectors 120(1)-(6) in response to determining that line card 102 is a medium-density type. In such examples, this configuration may cause and/or enable links 122(1)-(6) to be communicatively coupled to links 112(1)-(6) via fabric cards 130(1)-(6). Accordingly, traffic may be exchanged between line cards 102 and 104 via links 112(1)-(6) and 122(1)-(6) and/or fabric cards 130(1)-(6).

Figure 5:
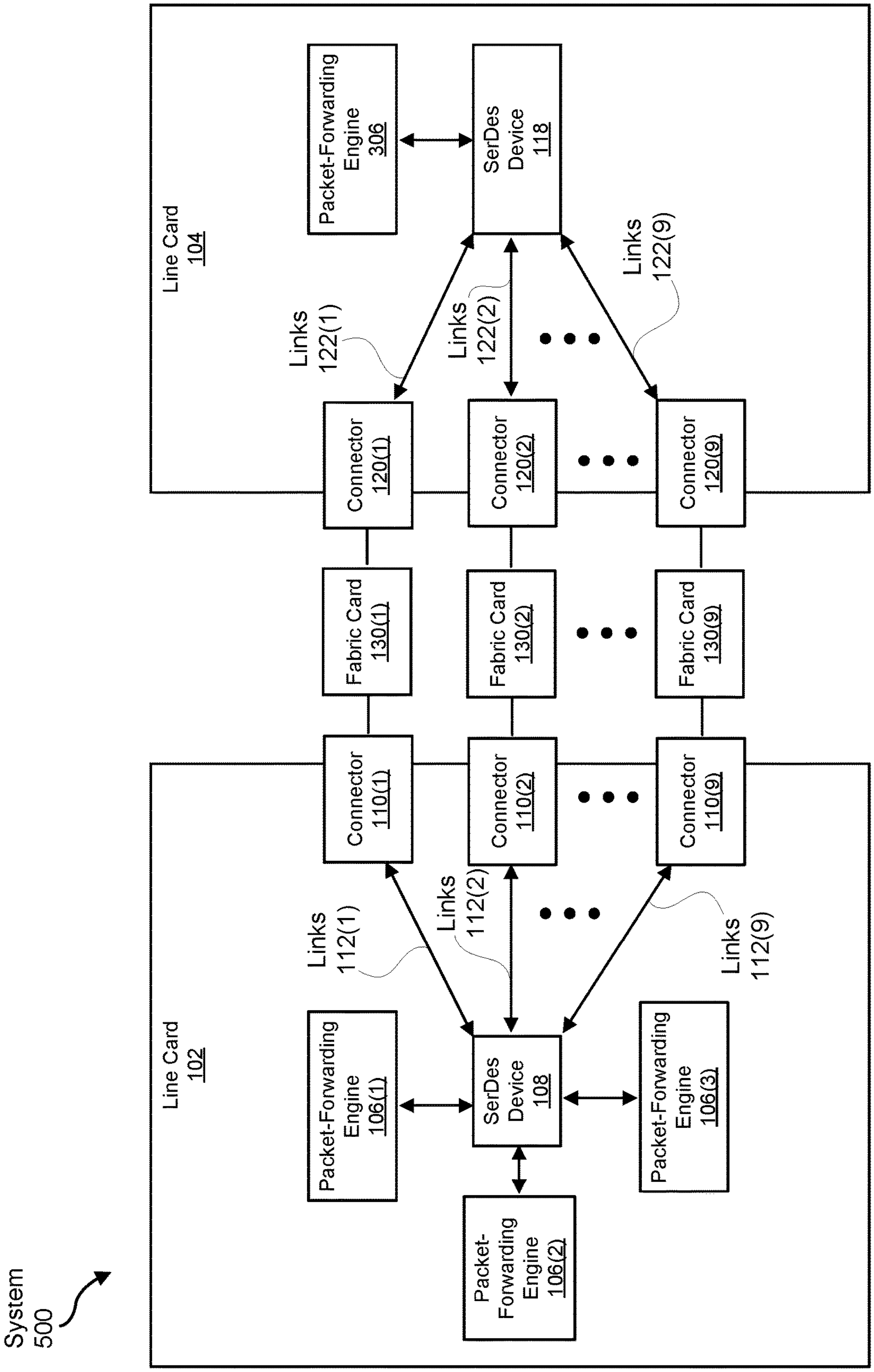
FIG. 5 is an illustration of an exemplary system for selectively configuring line cards to conserve power in network fabrics according to one or more embodiments of this disclosure.

FIG. 5 illustrates an exemplary system 500 for selectively configuring line cards to conserve power in network fabrics. In some examples, system 500 may include and/or represent certain devices, components, and/or features that perform and/or provide functionalities that are similar and/or identical to those described above in connection with any of FIGS. 1-4. In one example, system 500 may include and/or represent a configuration in which line card 102 is connected to a high-density line card. For example, line card 102 may be a high-density type that includes and/or represents packet-forwarding engines 106(1)-(3) and connectors 110(1)-(9). Additionally or alternatively, line card 104 may be low-density type that includes and/or represents packet-forwarding engine 306 and connectors 120(1)-(9).

In some examples, circuitry 116 may determine that line card 102 is a high-density type. For example, circuitry 116 may obtain data and/or information from line card 102. In this example, the data and/or information may indicate that line card 102 includes and/or is equipped with packet-forwarding engines 106(1)-(3) and connectors 110(1)-(9). Circuitry 116 may then determine that line card 102 is a high-density type based at least in part on the data and/or information.

In some examples, circuitry 116 may program SerDes device 118 to define a configuration in which links 122(1)-(9) are routed and/or activated between SerDes device 118 and one or more of connectors 120(1)-(9) in response to determining that line card 102 is a high-density type. In such examples, this configuration may cause and/or enable links 122(1)-(9) to be communicatively coupled to links 112(1)-(9) via fabric cards 130(1)-(9). Accordingly, traffic may be exchanged between line cards 102 and 104 via links 112(1)-(9) and 122(1)-(9) and/or fabric cards 130(1)-(9).

Figure 6:
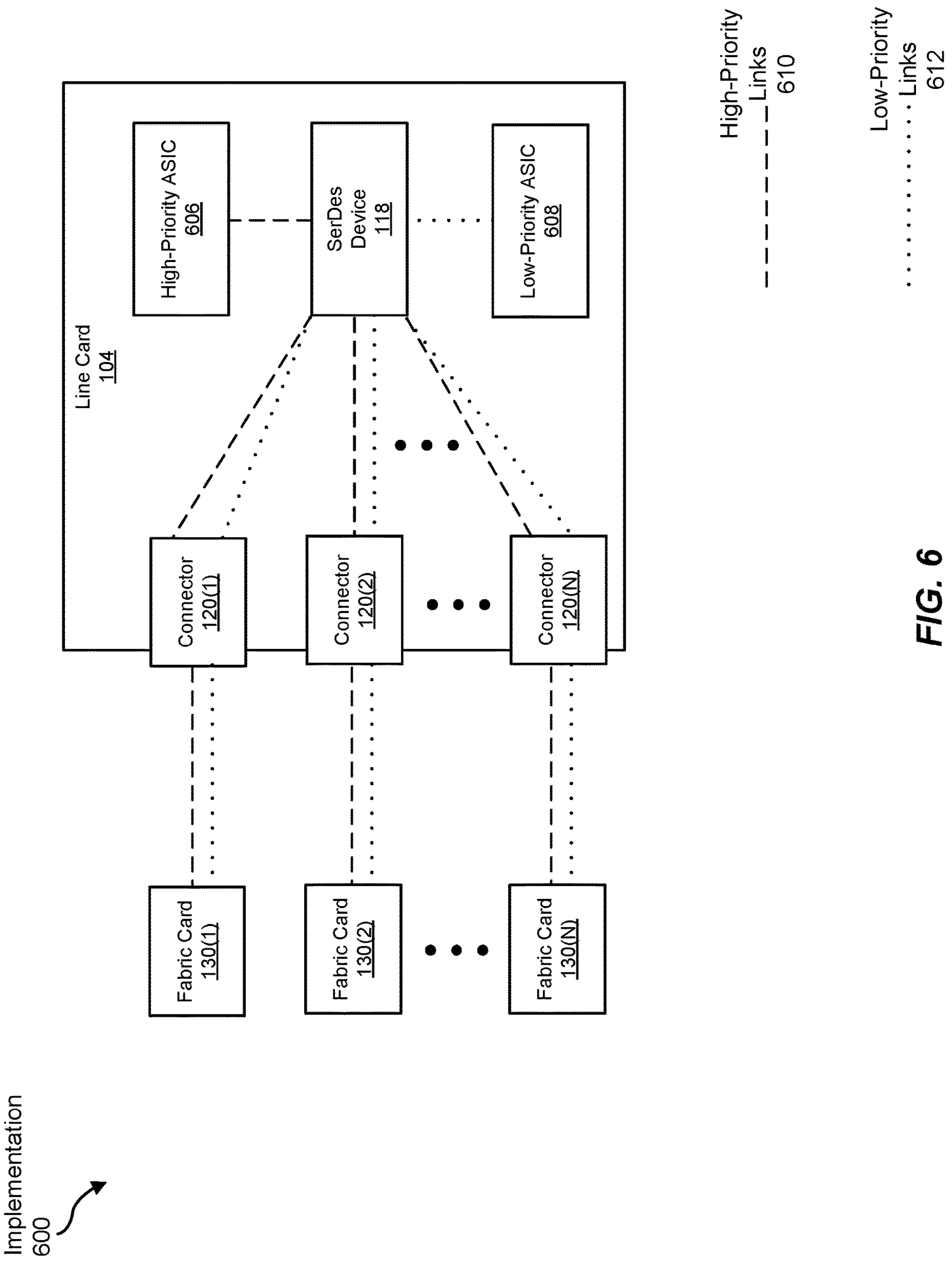
FIG. 6 is an illustration of an exemplary implementation of a line card capable of selectively configuring links according to one or more embodiments of this disclosure.

FIG. 6 illustrates an exemplary implementation 600 of line card 104 and fabric cards 130(1)-(N). In some examples, implementation 600 may include and/or represent certain devices, components, and/or features that perform and/or provide functionalities that are similar and/or identical to those described above in connection with any of FIGS. 1-5. In one example, line card 104 may include and/or represent a high-priority ASIC 606 and/or a low-priority ASIC 608 communicatively coupled to SerDes device 118. In this example, high-priority ASIC 606 may be configured to forward high-priority traffic via one or more of fabric cards 130(1)-(N), and low-priority ASIC 608 may be configured to forward low-priority traffic via one or more of fabric cards 130(1)-(N).

In some examples, line card 104 may include and/or represent high-priority links 610 that run between SerDes device 118 and each of connectors 120(1)-(N). In such examples, high-priority links 610 may carry and/or transport the high-priority traffic associated with and/or forwarded by high-priority ASIC 606. In one example, line card 104 may also include and/or represent low-priority links 612 that run between SerDes device 118 and each of connectors 120(1)-(N). In this example, low-priority links 612 may carry and/or transport the low-priority traffic associated with and/or forwarded by low-priority ASIC 608.

In some examples, circuitry 116 may detect the failure of one of high-priority links 610. In one example, circuitry 116 may redirect the high-priority traffic associated with the failed high-priority link to one of low-priority links 612 in response to detecting the failure. Additionally or alternatively, circuitry 116 may redirect the low-priority traffic associated with that low-priority link to the failed high-priority link.

Figure 7:
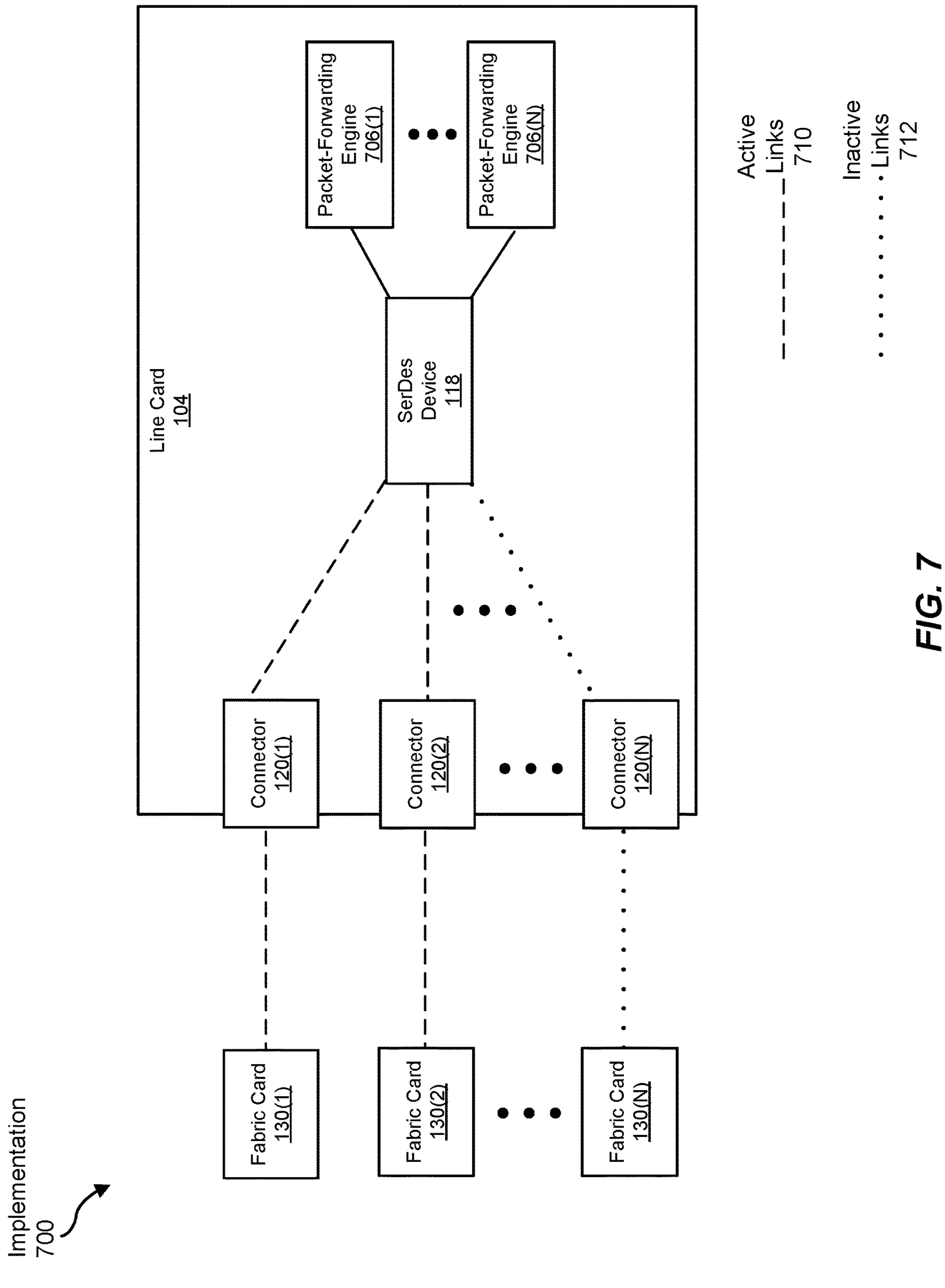
FIG. 7 is an illustration of an exemplary implementation of a line card capable of selectively configuring links according to one or more embodiments of this disclosure.

FIG. 7 illustrates an exemplary implementation 700 of line card 104 and fabric cards 130(1)-(N). In some examples, implementation 700 may include and/or represent certain devices, components, and/or features that perform and/or provide functionalities that are similar and/or identical to those described above in connection with any of FIGS. 1-6. In one example, line card 104 may include and/or represent packet-forwarding engines 706(1)-(N) communicatively coupled to SerDes device 118. In this example, line card 104 may include and/or represent active links 710 that run between SerDes device 118 and at least connectors 120(1)-(2). Additionally or alternatively, active links 710 may carry traffic that traverses and/or passes through at least fabric cards 130(1)-(2). In certain implementations, active links 710 may be activated to carry traffic between at least connectors 120(1)-(2) and SerDes device 118 in connection with packet-forwarding engines 706(1)-(N).

In some examples, line card 104 may also include and/or represent inactive links 712 that run between SerDes device 118 and at least connector 120(N). In one example, inactive links 712 may be deactivated to remain idle (e.g., abstain from carrying traffic) between at least connector 120(N) and SerDes device 118 in connection with packet-forwarding engines 706(1)-(N). Accordingly, inactive links 712 may remain in a backup state to provide failover functionality for active links 710 in the event that one of fabric cards 130(1)-(3) experiences a failure.

As a specific example, circuitry 116 may detect a failure of fabric card 130(2). In one example, circuitry 116 may identify fabric card 130(N) as being communicatively coupled to and/or routed to connector 120(N). In this example, circuitry 116 may determine that inactive links 712 run and/or are routed between SerDes device 118 and connector 120(N). Accordingly, circuitry 116 may redirect traffic associated with one or more of active links 710 implicated by the failure of fabric card 130(2) to one or more of inactive links 712. In other words, circuitry 116 may activate and/or enable one or more of inactive links 712 to carry the traffic redirected from one or more of active links 710. Additionally or alternatively, circuitry 116 may deactivate and/or disable those of active links 710 implicated by the failure of fabric card 130(2).

In some examples, the various apparatuses, devices, and systems described in connection with FIGS. 1-7 may include and/or represent one or more additional circuits, components, and/or features that are not necessarily illustrated and/or labeled in FIGS. 1-7. For example, the apparatuses, devices, and systems illustrated in FIGS. 1-7 may also include and/or represent additional analog and/or digital circuitry, onboard logic, transistors, RF transmitters, RF receivers, transceivers, antennas, resistors, capacitors, diodes, inductors, switches, registers, flipflops, digital logic, connections, traces, buses, semiconductor (e.g., silicon) devices and/or structures, processing devices, storage devices, circuit boards, sensors, packages, substrates, housings, combinations or variations of one or more of the same, and/or any other suitable components. In certain implementations, one or more of these additional circuits, components, and/or features may be inserted and/or applied between any of the existing circuits, components, and/or features illustrated in FIGS. 1-7 consistent with the aims and/or objectives described herein. Accordingly, the couplings and/or connections described with reference to FIGS. 1-7 may be direct connections with no intermediate components, devices, and/or nodes or indirect connections with one or more intermediate components, devices, and/or nodes.

In some examples, the phrase "to couple" and/or the term "coupling", as used herein, may refer to a direct connection and/or an indirect connection. For example, a direct coupling between two components may constitute and/or represent a coupling in which those two components are directly connected to each other by a single node that provides continuity from one of those two components to the other. In other words, the direct coupling may exclude and/or omit any additional components between those two components.

Additionally or alternatively, an indirect coupling between two components may constitute and/or represent a coupling in which those two components are indirectly connected to each other by multiple nodes that fail to provide continuity from one of those two components to the other. In other words, the indirect coupling may include and/or incorporate at least one additional component between those two components.

In some examples, one or more components and/or features illustrated in FIGS. 1-7 may be excluded and/or omitted from the various apparatuses, devices, and/or systems described in connection with FIGS. 1-7. For example, although FIG. 1 illustrates system 100 as including fabric cards 130(1)-(N) and/or SerDes device 108 in line card 102, alternative implementations of system 100 may exclude and/or omit fabric cards 130(1)-(N) and/or SerDes device 108 altogether.

Figure 8:
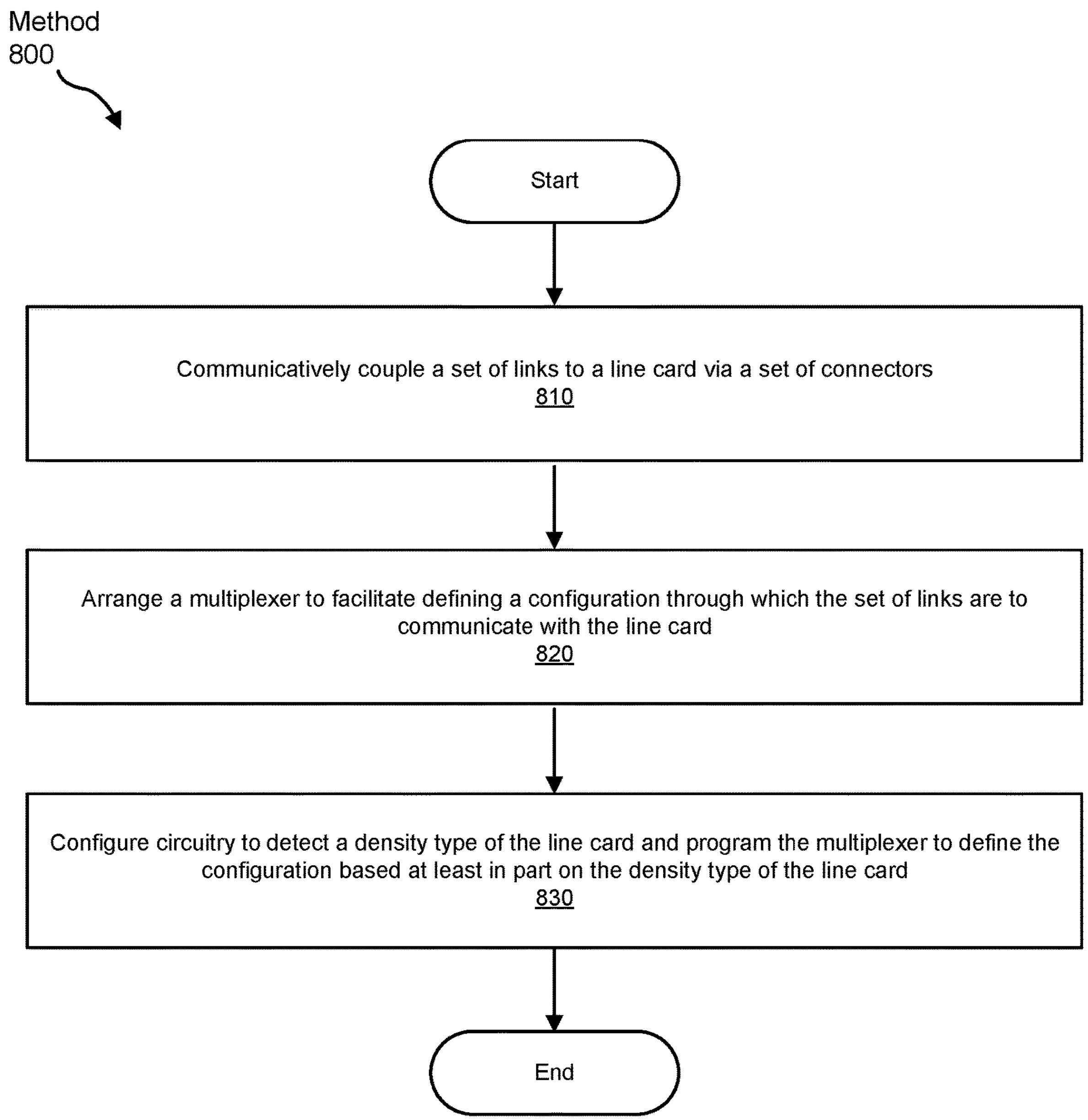
FIG. 8 is a flow diagram of an exemplary method for selectively configuring line cards to conserve power in network fabrics according to one or more embodiments of this disclosure.

FIG. 8 is a flow diagram of an exemplary method 800 for selectively configuring line cards to conserve power in network fabrics. Method 800 may include the step of communicatively coupling a set of links to a line card via a set of connectors (810). Step 810 may be performed in a variety of ways, including any of those described above in connection with FIGS. 1-7. For example, a computing equipment manufacturer or subcontractor may communicatively couple a set of links to a line card via a set of connectors.

Method 800 may also include the step of arranging a multiplexer to facilitate define a configuration through which the set of links are to communicate with the line card (820). Step 820 may be performed in a variety of ways, including any of those described above in connection with FIGS. 1-7. For example, the computing equipment manufacturer or subcontractor may configure, program, and/or arrange a multiplexer to facilitate define a configuration through which the set of links are to communicate with the line card.

Method 800 may further include the step of configuring circuitry to detect a density type of the line card and to program the multiplexer to define the configuration based at least in part on the density type of the line card (830). Step 830 may be performed in a variety of ways, including any of those described above in connection with FIGS. 1-7. For example, the computing equipment manufacturer or subcontractor may configure circuitry to detect a density type of the line card and to program the multiplexer to define the configuration based at least in part on the density type of the line card.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
- a first line card; and
- a second line card that comprises:
  - a set of connectors capable of communicatively coupling a set of links to the first line card;
  - a multiplexer that facilitates defining a configuration through which the set of links are communicatively coupled to the first line card via the set of connectors; and
  - circuitry that:
    - detects a density type of the first line card by at least being configured to:
      - obtain information indicative of a number of components with which the first line card is equipped; and
      - determine that the number of components satisfies at least one threshold corresponding to the density type; and
    - programs the multiplexer to define the configuration based at least in part on the density type of the first line card.

2. The system of claim 1, wherein:
- the first line card comprises a high-density line card equipped with the number of components that exceeds an upper threshold; and
- the circuitry programs the multiplexer to define the configuration based at least in part on the high-density line card.

3. The system of claim 2, wherein the circuitry programs the multiplexer to define the configuration such that the set of links are communicatively coupled to the first line card via all connectors included in the set of connectors.

4. The system of claim 2, wherein the components comprise at least one of:
- one or more packet-forwarding engines; or
- one or more ports.

5. The system of claim 1, wherein:
- the first line card comprises a medium-density line card equipped with the number of components that satisfies the at least one threshold; and
- the circuitry programs the multiplexer to define the configuration based at least in part on the medium-density line card.

6. The system of claim 5, wherein the circuitry programs the multiplexer to define the configuration such that the set of links are communicatively coupled to the first line card via a medium subset of connectors included in the set of connectors.

7. The system of claim 6, wherein the medium subset of connectors comprises a grouping consisting of between one-third and two-thirds of all connectors included in the set of connectors.

8. The system of claim 1, wherein:
- the first line card comprises a low-density line card equipped with the number of components that satisfies a lower threshold; and
- the circuitry programs the multiplexer to define the configuration based at least in part on the low-density line card.

9. The system of claim 8, wherein the circuitry programs the multiplexer to define the configuration such that the set of links are communicatively coupled to the first line card via a low subset of connectors included in the set of connectors.

10. The system of claim 9, wherein the low subset of connectors comprises a grouping consisting of one-third or less of all connectors included in the set of connectors.

11. The system of claim 1, further comprising a serializer/deserializer (SerDes) device that includes the multiplexer and a demultiplexer.

12. The system of claim 1, wherein the circuitry further:
detects a failure of a high-priority link that is included in the set of links;
redirects traffic associated with the high-priority link to a low-priority link included in the set of links in response to detecting the failure of the high-priority link; and
redirects traffic associated with the low-priority link to the high-priority link.

13. The system of claim 1, further comprising a set of fabric cards that are communicatively coupled between the set of connectors and the first line card.

14. The system of claim 13, wherein the circuitry further:
detects a failure of a fabric card included in the set of fabric cards;
identifies an additional fabric card that is included in the set of fabric cards; and
redirects traffic associated with at least one link that communicatively couples one of the set of connectors to the fabric card to at least one additional link that communicatively couples another one of the set of connectors to the additional fabric card.

15. An apparatus comprising:
a multiplexer that facilitates defining a configuration through which a set of links are communicatively coupled to the line card via a set of connectors; and
circuitry that:
detects a density type of the line card by at least being configured to:
obtain information indicative of a number of components with which the line card is equipped; and
determine that the number of components satisfies a threshold corresponding to the density type; and
programs the multiplexer to define the configuration based at least in part on the density type of the line card.

16. The apparatus of claim 15, wherein:
the line card comprises a high-density line card equipped with the number of components that exceeds an upper threshold; and
the circuitry programs the multiplexer to define the configuration based at least in part on the high-density line card.

17. The apparatus of claim 16, wherein the circuitry programs the multiplexer to define the configuration such that the set of links are communicatively coupled to the line card via all connectors included in the set of connectors.

18. The apparatus of claim 16, wherein the components comprise at least one of:
one or more packet-forwarding engines; or
one or more ports.

19. The apparatus of claim 15, wherein:
the line card comprises a medium-density line card equipped with the number of components that satisfies the at least one threshold; and
the circuitry programs the multiplexer to define the configuration based at least in part on the medium-density line card.

20. A method comprising:
communicatively coupling a set of links to a line card via a set of connectors;
configuring a multiplexer to facilitate defining a configuration through which the set of links are to communicate with the line card; and
configuring circuitry to:
detect a density type of the line card at least by:
obtaining information indicative of a number of components with which the line card is equipped; and
determining that the number of components satisfies a threshold corresponding to the density type; and
program the multiplexer to define the configuration based at least in part on the density type of the line card.

* * * * *